(12) United States Patent
Martin

(10) Patent No.: US 8,101,069 B2
(45) Date of Patent: Jan. 24, 2012

(54) EXTERNAL FILTERING AND ABSORBING DEVICE FOR USE IN A LOCAL CONTAINMENT AREA

(76) Inventor: Sky Bleu Martin, Seattle, WA (US)

(*) Notice: Subject to any disclaimer, the term of this patent is extended or adjusted under 35 U.S.C. 154(b) by 262 days.

(21) Appl. No.: 12/615,960

(22) Filed: Nov. 10, 2009

(65) Prior Publication Data

US 2011/0108492 A1    May 12, 2011

(51) Int. Cl.
*E02B 15/04* (2006.01)
*B01D 35/00* (2006.01)

(52) U.S. Cl. .............. 210/85; 210/170.05; 210/242.4; 210/922

(58) Field of Classification Search ........... 210/242.4, 210/680, 691–693, 85, 170.05, 922
See application file for complete search history.

(56) References Cited

U.S. PATENT DOCUMENTS

| | | | |
|---|---|---|---|
| 6,073,382 | A | 6/2000 | Willener |
| 6,432,304 | B1 | 8/2002 | Nguyen |
| 6,743,367 | B2 | 6/2004 | Dreyer |
| 6,848,861 | B2 | 2/2005 | Dreyer |
| 7,479,221 | B2* | 1/2009 | Paoluccio et al. ............. 210/163 |
| 2007/0246424 | A1 | 10/2007 | Honda |
| 2008/0017591 | A1 | 1/2008 | Ranade |
| 2008/0229995 | A1 | 9/2008 | Dreyer |
| 2008/0283467 | A1 | 11/2008 | Nguyen |

FOREIGN PATENT DOCUMENTS

WO    WO2004/090243    10/2004
WO    WO/2009/026924    5/2009

OTHER PUBLICATIONS

Federal Register 44644 / vol. 74, No. 166 / Friday, Aug. 28, 2009 /Proposed Rules.
Prepared by the California State Lands Commission, Marine Invasive Species Program Oct. 2010 Update: Ballast Water Treatment Technologies For Use In California Waters found at http://www.psmfc.org/ballast/wordpress/wp-content/uploads/2009/10/CSLCTechUpdate2009_final.pdf, (2009).

* cited by examiner

*Primary Examiner* — Chester Barry
(74) *Attorney, Agent, or Firm* — Not Just Patents LLC; Wendy Peterson

(57) ABSTRACT

An External Filtering and Absorbing Device for Use in a Local Containment Area contains filter material with a mesh size not less than 50 microns for removing contaminants from ballast or bilge water from a ship or effluent from a storm drain. Examples of contaminants removed are aquatic nonindigenous species such as Fish, Zebra and Quagga Mussels, Asiatic Clam, Aquatic Weeds, Green Crabs, or other suspended particle contaminants. Filtering is accomplished above the ambient water allowing easy visual verification and visual gratification of the efficacy of the filter unlike closed on-board systems. Water and oil permeate the filter and flow into a local containment area where oil is absorbed by absorbent pads held in pockets. The filter is easily removed and can be sent to authorities to demonstrate compliance with environmental standards. Water sampling containers or instruments used with the assembly allow for further compliance monitoring.

3 Claims, 3 Drawing Sheets

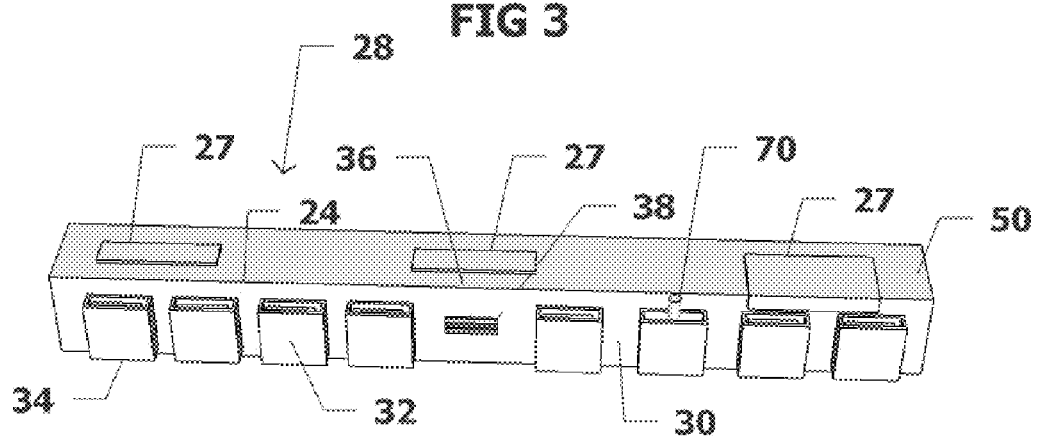
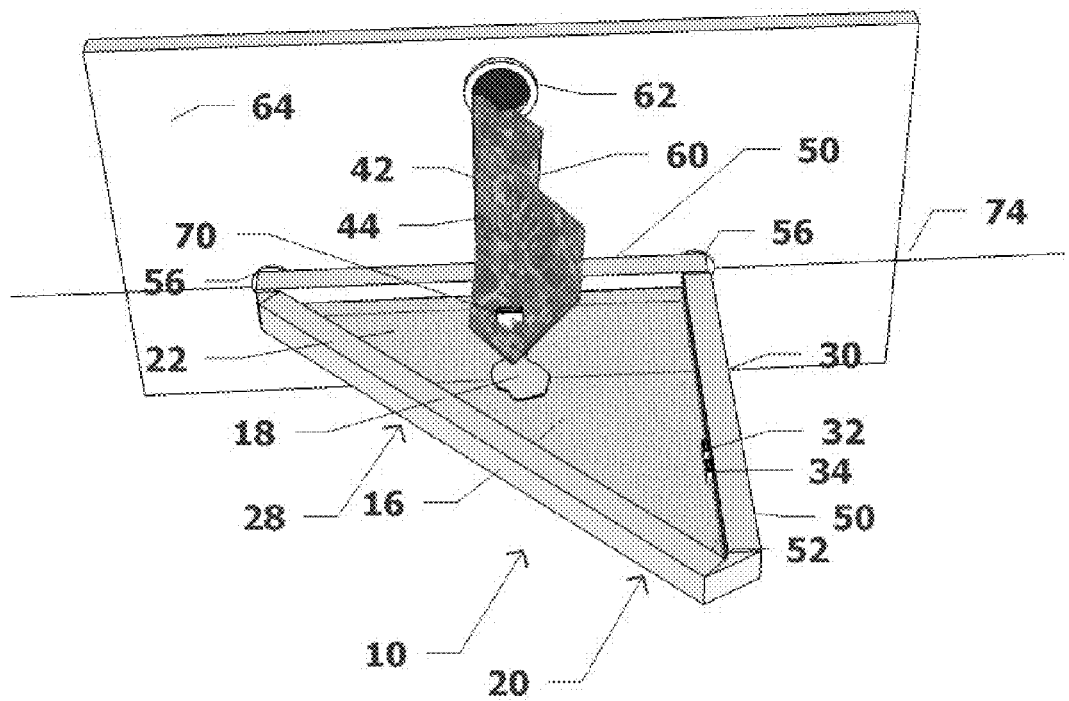

EXTERNAL FILTERING AND ABSORBING DEVICE FOR USE IN A LOCAL CONTAINMENT AREA

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This present device relates to an External Filtering and Absorbing Device for Use in a Local Containment Area. Use of the present device can stop evasive aquatic nonindigenous species, invasive aquatic plant life, other solids, and oil that is present in ship ballast and bilge water from harming coastal, lake and other waters by filtering the ship ballast and bilge discharge using an external filtering device above the ambient water and using absorbing materials to absorb oil in the discharge after it is filtered. Because of the versatility of the device created by having a local containment right at the source of the discharge, water sampling can be obtained right at the outlet before the water hits the filter and/or after the water has been filtered to give quantitative and qualitative evidence of the content of the discharge.

The problem of evasive aquatic nonindigenous species being spread by ship ballast and bilge water is huge. "According to U.S. Coast Guard (USCG) Admiral Ronald F. Silva, "The problem of invasive species is the highest priority marine environmental issue for the U.S. Coast Guard." He adds that while the problem is certainly not confined to the Ninth District (the Great Lakes), the area—being a source of drinking water for 37 million North Americans—potentially has the most at stake in this regard." (Joseph Keefe, "Ballast Water Management:Industry Leading the Way," Maritime Executive, September 2007, p. 36.)

The high financial cost of the harm of Aquatic Nonindigenous Species is stated in The Federal Register 44644/Vol. 74, No. 166/Friday, Aug. 28, 2009 quoting Pimentel, D. et al., 2005. "Update on the environmental and economic costs associated with alien-invasive species in the United States," Ecological Economics. 52:273-288:

Estimated Annual Costs Associated to Aquatic
Nonindigenous Species Introduction in the U.S.
($2007)

Species Costs
Fish . . . $5.7 billion.
Zebra and Quagga Mussels. $1.06 billion.
Asiatic Clam . . . $1.06 billion.
Aquatic Weeds . . . $117 million.
Green Crab . . . $47 million.
Though a particular invasion may have small direct economic impacts, the accumulation of these events may cost in the billions of dollars every year. Only a few invasions to date have led to costs in the billions of dollars per year.

Since October 2004, all vessels, U.S. and foreign, operating in U.S. waters and bound for U.S. ports or places, have been required to submit reports of their Ballast Water Management practices to the National Ballast Information Clearinghouse (NBIC) database. 33 CFR 151.2041. Also vessels equipped with ballast water tanks and bound for ports or places of the United States are required to conduct a mid-ocean ballast water exchange (BWE), retain their ballast water onboard, or use an alternative environmentally sound BWM method approved by the Coast Guard. Penalties for Failure to Comply with Mandatory BWM Requirements (as of May 21, 2009): Maximum fine of $27,500 per day. Willful violations=Class C Felony.

To solve the problems associated with the evasive aquatic nonindigenous species, regulations have been made both locally in the U.S. and internationally to control the time and place of ballast and bilge water discharge when environmentally sound methods are not available. Manufacturers have responded with environmentally sound solutions that are on-board filtering in combination with other technology devices. These prior art devices that do not have any elements in common with the present device (off-board filtering). See http://www.psmfc.org/ballaNt/wordpress/wp-content/uploadst2009/10/CSLCTechUpdate2009_final.pdf for October 2010 Update:
Ballast Water Treatment Technologies For Use In California Waters, for a chart of manufacturers and technologies for on-board water ballast treatment systems.

Animal and plant species are not the only problem with discharges from ballast and bilge water. A single quart of oil from any source has the potential to foul more than 100,000 gallons of water. There is no such thing as a vessel that doesn't discharge into the surrounding waters, solutions need to be tailored to vessels of all sizes and efficient solutions are betters answers than costly devices that takes years and massive expense to implement.

Prior art devices that do have some elements in common with the present device have some filtering capabilities that are associated with booms but they do not address the problem of evasive aquatic nonindigenous species in ship ballast and bilge water discharge, do not address the problem of oil in the discharge, do not filter above the ambient water, and do not address the problem in a simple or cost effective way with a minimum of downtime for the ship.

The U.S. patent to Willener 2000 (U.S. Pat. No. 6,073, 382), uses a containment boom with a filtering system in harvesting brine shrimp eggs. This device is part of a system for harvesting brine shrimp eggs that employs a water-permeable boom and a non-localized filtering system but for a completely different purpose than the present device and contains many additional components specific to its purpose including a specially built platform for managing the use of the device. This device does not filter bilge or ballast water or remove contaminants and does not filter above the ambient water. Its function is conversely to increase the level of contaminants (shrimp eggs) in marine water rather than decrease them.

The U.S. patent to Dreyer 2005 (U.S. Pat. No. 6,848,861) and associated international applications and patents, Y-PANEL ANCHORING SYSTEM FOR BOOM INSTALLATION, have an anchoring system for containment/exclusion boom for controlling contaminants in bodies of water, with Y-panel member connected to curtain, and ballast to maintain distal end of skirt panels against floor of body of water. This device, like other prior art, relies on anchors to hold it in place making it very difficult to set up quickly causing significant periods of downtime for the ship and a crew dedicated to setting up the lengthy boom. This device and other devices in the prior art that are designed to be part of a boom system that entirely circles the ship are difficult and expensive to use and not specifically designed or suitable for ballast and bilge water filtering. This device does not filter above the ambient water. This device is also limited to use in relatively shallow water.

The U.S. patent application from Hap Nguyen (Ship Side Ballast Water Treatment Systems US20080283467) addresses the necessity of filtering ballast water and the impracticalities and expense of ship board systems but limits the place to filter ballast water to where a land vehicle can access the ship and still involves expensive equipment and significant downtime for the ship. This device does not filter above the ambient water.

Other devices in the prior art filter intake ballast water and do not meet the requirements or necessity of filtering for outbound discharges such as the necessity to remove oil or other debris that is generated by the ship from being discharged into the ambient water or the removal of other incidentals in the discharges.

BRIEF SUMMARY OF THE INVENTION

One object of the present device is to provide a simple mechanical filtering device to filter evasive aquatic nonindigenous species out of ship ballast and bilge water by discharging ship ballast and bilge water through the present device which is mounted on a local containment boom system above the ambient water. Another object of the present invention is to provide compliance information that is easy to acquire and offers immediate visual indications and confirmation of the benefits of using the present invention. The present device as used with the local containment boom system is inexpensive to purchase, easy to store onboard or on service vehicles (land or water), easy to set-up and tear down, and helps to demonstrate compliance with regulations under 33 CFR 151.2041 for suspended marine debris 50 microns and above in size. Water sampling containers or instruments can be easily attached in various places on and around the present device to allow for unfiltered or filtered water samples to be obtained for further compliance testing.

In addition to the filtering out of evasive aquatic nonindigenous species, plant life, and other solids out of discharges, the present device traps oil and other floating liquid contaminants inside the containment area of the local containment boom and absorbs these liquids using absorbent pads stored in pockets in the sleeves that surround the inside of the local containment area.

Another object of the present device is to provide a simple mechanical filtering device and/or absorption device to filter particulates, solid waste and oil from storm drain runoff by mounting the present device on a local containment boom system placed under the storm discharge pipes configured on a track so that the present device rises and falls with the tide. The present device as used with the local containment boom system is inexpensive to purchase, easy to inventory, easy to set-up and tear down, and readily demonstrates compliance with regulations. The present device also may be used just for oil and other floating contaminants only if the discharge from the storm drain contains too many or too large contaminants that the filter would be exhausted or broken within a short time frame. Additional Enviro Booms can be attached to create a larger containment field if needed.

Setting up the external filtering assembly takes only a few minutes for slipping the sleeve assemblies onto the Enviro Boom, placing the filter assembly onto the sleeve assembly and placing the Enviro Boom structural positioning magnets against the hull of the ship and any needed triangular arm stops in place. Filtering the discharge and demonstrating compliance with ballast discharge regulations is just a matter of discharging the ballast and/or bilge water from a port though the filter, removing the filter and placing the used filter in a tube or heavy plastic bag to mail or otherwise transport to authorities on shore for testing. Oil is automatically absorbed by absorbent pads that are contained in pockets on the assembly and additional clean-up if necessary is easy by throwing additional absorbent pads inside the local containment area Using this device, ship owners and operators can cost effectively and quickly comply with both the letter of the regulations and easily comply with the purpose of the regulations by stopping aquatic nonindigenous species and oil from entering ambient marine water decreasing the harm to vast amounts of drinking water, indigenous species and oceans, rivers, lakes and streams.

BRIEF DESCRIPTION OF THE SEVERAL VIEWS OF THE DRAWINGS

FIG. 3 is a prospective view of the boom attachment assembly of the present device as it is fitted over an Enviro Boom.

FIG. 4 is a prospective view of a three-sided external filter and boom attachment assembly using an Enviro Boom for support below the discharge of ship ballast and/or bilge water.

DETAILED DESCRIPTION OF THE INVENTION

Figure 1:
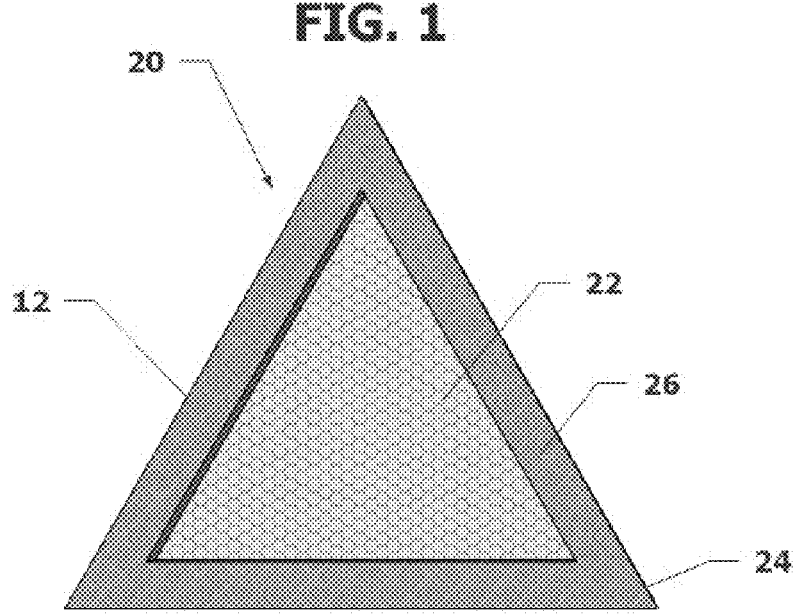
FIG. 1 is a bottom view of a three-sided filter assembly.

Referring now to the drawings in detail wherein like reference numerals have been used throughout FIGS. 1-6 to designate like elements:

An external filter and boom attachment assembly 10 comprising a filter assembly 20 and a boom attachment assembly 28 with the filter assembly 20 comprising a section of filter material 22 with a an appropriate mesh size (not less than 50 microns) appropriate for filtering an applicable contaminated discharge 66 including a ballast water or bilge water 60 from a port 62 of a ship 64 or an effluent from a storm drain 58 or the applicable contaminated discharge 66 from another source—in order to remove a plurality of contaminants 18 (evasive aquatic nonindigenous species such as Fish, Zebra and Quagga Mussels, Asiatic Clam, Aquatic Weeds, Green Crabs, etc. or other suspended particle contaminants) easily visually verifying the operation of the filter assembly 20 while allowing a plurality of water 42 and oil 44 to permeate the filter assembly 20, with a plurality of section filter material sides 12 to secure to a plurality of shapes of support systems 68, a plurality of finished edges 24 on the filter material section 22 to keep the filter material section 22 from shredding or losing its shape, a plurality of filter assembly hook- and loop-fasteners 26 of sufficient width and strength or other fastening means to provide joining to the boom attachment assembly 28 and providing easy removal from the boom attachment assembly 28 so the filter assembly 20 can be removed and given to authorities to demonstrate compliance with environmental standards. The boom attachment assembly comprises a plurality of sections of sleeve material 30 fitted over the Enviro Boom 50 with a plurality of sections of boom attachment hook- and loop-fasteners 27 or other fastening means attached to the sleeve material 30, a plurality of absorbent pad pockets 32 facing an inside containment area 16 for holding a plurality of absorbent pads 34, with a plurality of finished edges 24 to keep the sleeve material 30 from shredding or losing its shape. A plurality of mechanical connectors 36 fasten the boom attachment assembly 28 to a support system 68 such as an Enviro Boom 50 local containment boom and provide other fastening needs. A plurality of openings 38 in the sleeve material 30 to allow access to mechanical connectors 36 on a plurality of Enviro Booms 50 under the boom attachment assembly 28, a plurality of magnetic interface strips 54 and a plurality of Enviro Boom structural positioning magnets 56 as necessary to secure the external filtering device 10 to a ship 64 at a waterline 74 or other marine structure where necessary, and a plurality of triangular arm stops 52 to secure the shape of the support system 68 and to secure a plurality of water sampling containers or instruments 70 in order to monitor the filtered water for compliance with environmental standards. For filtering storm drain effluent 58, a plurality of tracks 76 are mounted next to the storm drain 72 so that the assembly 10 can ride up and down with the waterline 74 (tide) with a mechanical connector 36 attaching the assembly to the track 76.

One additional use of the present device is where a plurality of assemblies are mounted next to a ship or other aquatic structure to act as a catch-all for tools, material being removed from the ship, or other things when workers are working on the structure for safety reasons, to reduce loss of materials, and to prevent further contamination of the water.

A method of filtering contaminated discharge from ships, boats, other aquatic structures, or storm drains is also being disclosed wherein a filter assembly is attached to a local containment boom assembly or other local flotation system with absorbent pads and water sampling containers or instruments being attached to or contained within the local containment area of the flotation system where the discharge is poured through the filter assembly to remove contaminants and wherein water and oil passes through the filter and wherein oil is absorbed by the absorbent pads. Filtered discharge passes safely into the ambient water supply.

Referring now to the drawings in detail wherein like reference numerals have been used throughout FIGS. 1-6 to designate like elements, there is shown in FIG. 1, one subassembly of the device, a filter assembly 20. The filter assembly 20 comprising a section of filter material 22 with an appropriate mesh size (not less than 50 microns) appropriate for filtering an applicable contaminated discharge 64 (ballast water or bilge water 60 from a port 62 of a ship 64 or effluent from a storm drain 58 or the applicable contaminated discharge 64 from another source) and of sufficient strength to not lose its shape in order to remove a plurality of contaminants 18 while allowing a plurality of water 42 and oil 44 to permeate the filter assembly 20. The filter assembly 20 has a plurality of section filter material sides 12 to secure to a plurality of shapes of support systems 68 with a three-sided shape shown in FIG. 1, FIG. 4, and FIG. 6 and a four-sided shape shown in FIG. 2.

The filter material has finished edges 24 on the filter material section 22 to keep the filter material 22 from shredding or losing its shape. A plurality of hook- and loop-fasteners 26 on the filter assembly 20 or other fastening means to provide joining to hook- and loop-fasteners 27 on the boom attachment assembly 28 and provide easy removal from the boom attachment assembly 28 so the filter assembly 20 can be removed and given to authorities to demonstrate compliance with environmental standards. The filter assembly 20 can be easily visually inspected and reused if it is not necessary to show compliance and if the filter assembly 20 is not too full of contaminants 18. A plurality of the boom attachment assemblies 28 are placed over the Enviro Boom 50 and held in place with mechanical connectors 36. The Enviro Boom 50 allows the filter assemblies 20 to be held in place under the discharge 64 and above the ambient water in the local containment area 16.

The hook- and loop-fasteners 26 along the finished edges 24 are of sufficient width and holding strength to attach to the boom attachment assembly 28 (FIG. 3) and hold under the pressure of the ballast and/or bilge water discharge 60 (or storm drain effluent discharge 58). The filter assembly 20 traps contaminants 18 above a predetermined size (50 microns or above) and allows water 42 and oil 44 to permeate through. The filtered water is safely discharged into the ambient water and any oil 44 or other floating liquid contaminants 18 are trapped inside the containment area 16 of the associated containment boom 28 and absorbed by the absorbent pads 34 contained within the absorbent pad pockets 32 or can later be absorbed by other means while the contaminants 18 are trapped in the local containment area 16. Water sampling containers or instruments 70 can be mounted inside the absorbent pad pockets 32, attached to the boom attachment assembly 28, tied to a line or cable above the filter assembly, allowed to float within the containment area 16, or attached by other means to the assembly 10 in order to get the most representative sample. The plurality of finished edges 24 are finished with a method well-known in the art. The plurality of hook- and loop-fasteners 26, 27 (or other fastening means) are attached to the plurality of finished edges 24 using a means well-known in the art.

Figure 2:
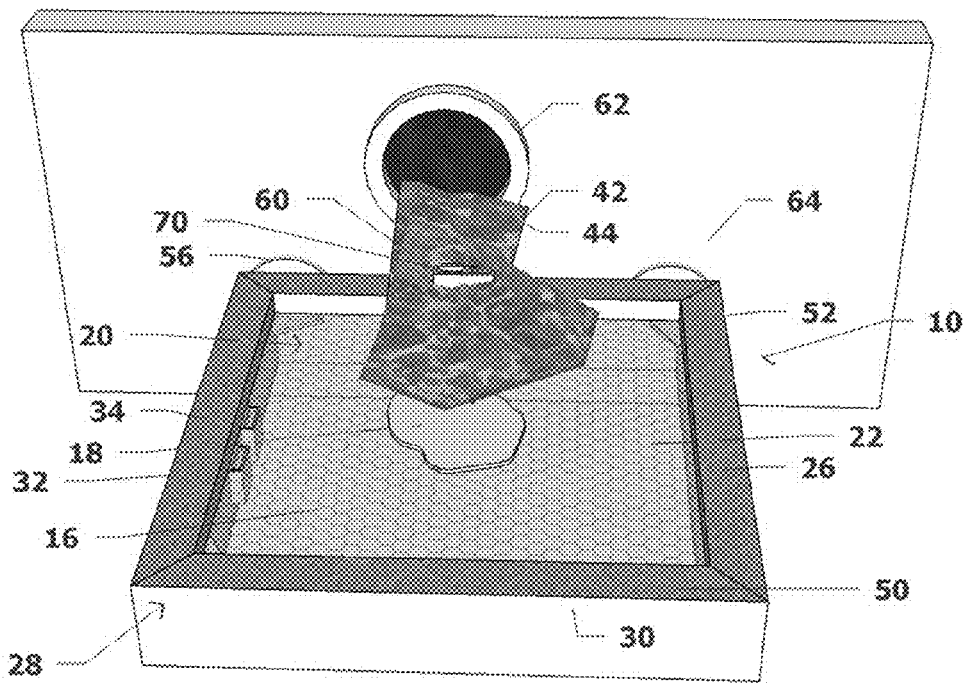
FIG. 2 is a prospective view of a four-sided external filter and boom attachment assembly using two Enviro Booms for support below the discharge of ship ballast and/or bilge water visually showing the contaminants being stopped by the filtering device.

As shown in FIG. 2 and FIG. 4, a support system 68 such as an Enviro Boom 50 local containment boom secures to the ship 64 at the waterline 74 with Enviro Boom structure positioning magnets 56 holding the ends and sides of the Enviro Boom 50 as needed depending on the volume of discharge 60, the flow rate of the discharge 60 and the size of the local containment area 16.

A plurality of openings 38 in the sleeve material 30 allow access to mechanical connectors 36 on a plurality of Enviro Boom 50 under the boom attachment assembly 28. If additional support strength is needed, a plurality of magnetic interfaces strips 54 and a plurality of Enviro Boom structural positioning magnets 56 are used as necessary to secure the external filtering device 10 to a ship 64 at a waterline 74 or other marine structure where necessary. A plurality of triangular arm stops 52 to secure the shape of the support system 68 and may also be used to secure a plurality of water sampling containers or instruments 70.

FIG. 3 is a prospective view of the boom attachment assembly 28 of the present device as it is fitted over an Enviro Boom 50 with pockets for absorbent pads 32 and a water sampling device shown 70.

FIG. 4 is a prospective view of the three-sided filter assembly 20 as part of the external filtering device 10 with one Enviro Boom 50 providing an interface for the external filtering and boom attachment assembly 10 to the ship 64 and a second Enviro Boom 50 supporting the assembly in a local containment area 16 below the discharge of ship ballast and/or bilge water 60. Note that each Enviro Boom 50 has two legs. Contaminants 18 are shown on the filter material 22 allowing easy visual verification and visual gratification of the efficacy of the filter as opposed to a closed on-board system.

Figure 5:
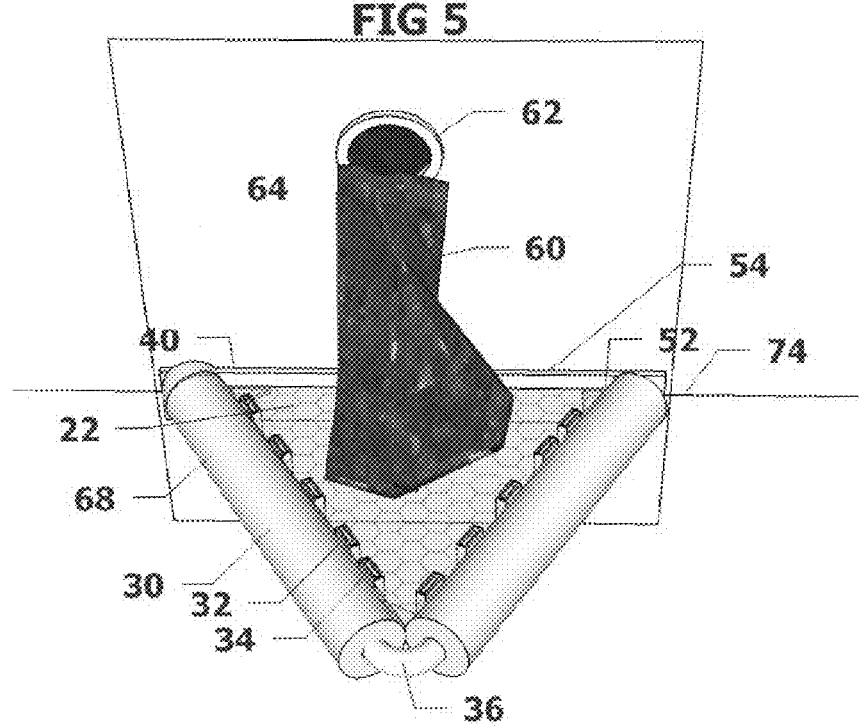
FIG. 5 is a prospective view of the three-sided external filter and boom attachment assembly with a magnetic interface strip providing an interface to the ship and boom attachment assemblies covering an alternative support system (flotation devices).

FIG. 5 is a prospective view of the three-sided filter assembly 20 as part of the external filtering assembly 10 with the magnetic interface strips 40 providing an interface to the ship and boom attachment assemblies 28 covering an alternative support system 68 consisting of long or multiple flotation devices.

Figure 6:
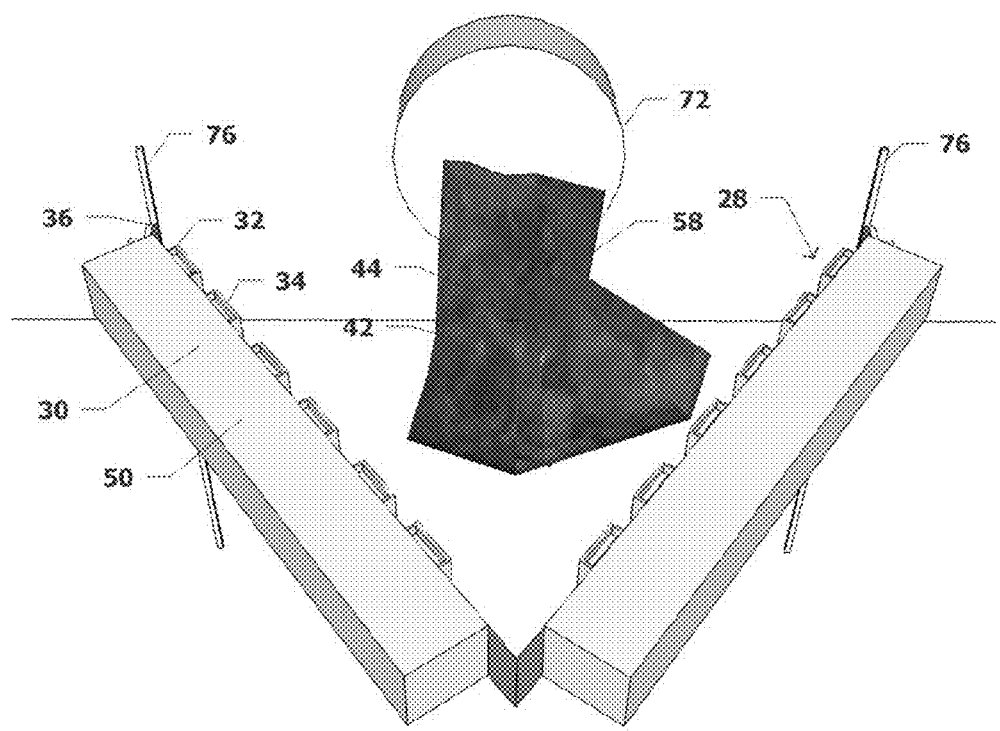
FIG. 6 is a prospective view of the three-sided external filter and boom attachment assembly with the device absorbing oil from storm drain effluent.

FIG. 6 is a prospective view of external filtering and absorbing device attachment assembly 10 filtering storm drain effluent 58. The hook- and loop-fasteners 26, 27 provide easy removal of the filter assembly 20 from the boom attachment assembly 28 so the filter assembly 20 can be removed and given to authorities to demonstrate compliance with environmental standards or can be removed to safely dispose of the contaminants 18 when it is full. For filtering storm drain effluent 58, a plurality of tracks 76 are mounted next to the storm drain 72 so that the assembly 10 can ride up and down with the waterline 74 (tide) with mechanical connectors 36 attaching the assembly to the track 76.

What is claimed is:

1. An external filtering device comprising a filter assembly and a boom attachment assembly to prevent water from being contaminated by contaminants that are present in ballast or bilge water discharges or storm drain effluent comprising:

a filter assembly comprising:
 a section of filter material with an appropriate mesh size (not less than 50 microns) appropriate for filtering contaminated discharge or storm water effluent in order to remove contaminants (such as Fish, Zebra and Quagga Mussels, Asiatic Clam, Aquatic Weeds, Green Crabs, or other suspended particle contaminants) allowing easy visual verification and visual gratification of the efficacy of the filter while allowing a mixture of water and oil to permeate the filter assembly,
 a plurality of section filter material sides to secure to a plurality of shapes of support systems,
 a plurality of finished edges on the filter material section to keep the filter material section from shredding or losing its shape, and
 a plurality of filter assembly hook- and loop-fasteners or other fastening means;

a boom attachment assembly comprising:
 a plurality of sections of sleeve material fitted over a containment boom, such as an Enviro Boom® containment boom, providing a means to attach elements to the boom attachment assembly,
 a plurality of sections of boom attachment hook- and loop-fasteners or other fastening means attached to the sleeve material providing a means to attach elements to the boom attachment assembly,
 a plurality of absorbent pad pockets facing an inside containment area for holding a plurality of absorbent pads to remove oil from the filtered discharge, with the plurality of finished edges to keep the sleeve material from shredding or losing its shape,
 a plurality of mechanical connectors to fasten the boom attachment assembly to a support system, such as an Enviro Boom® containment boom, and for other fastening needs,
 a plurality of openings in the sleeve material to allow access to the mechanical connectors on a plurality of said containment booms, e.g., Enviro Boom® containment booms, under the boom attachment assembly and to allow for the arms of the containment booms, e.g., Enviro Boom® containment booms, to move/bend independently,
 a plurality of magnetic interface strips with hook- and loop-fasteners to allow attachment of the boom attachment assembly to ships and other magnetic surfaces and a plurality of structural positioning magnets as necessary to secure the external filtering device to a ship at a waterline or other marine structure where necessary, and
 a plurality of triangular arm stops to secure the shape of the support system; and
 a plurality of water sampling containers or instruments in order to monitor the discharge or filtered water for compliance with environmental standards, wherein said plurality of filter assembly hook- and loop-fasteners or other fastening means are of sufficient width and strength to provide joining to said boom attachment assembly and providing easy removal from the boom attachment assembly so the filter assembly can be removed and given to authorities to demonstrate compliance with environmental standards.

2. The device of claim 1 wherein a plurality of tracks are mounted next to the storm drain so that the assembly can ride up and down with the waterline (tide) with mechanical connectors attaching the assembly to the track in order to filter the storm drain effluent and prevent oil from being discharged into the water and environment.

3. The device of claim 1 wherein a plurality of assemblies are mounted next to a ship to act as a catch-all for tools, material being removed from the ship or other things when workers are working on a ship, boat or other aquatic structure for safety reasons, to reduce loss of materials, and to prevent further contamination of the water.

* * * * *